United States Patent
Newbury

(10) Patent No.: US 10,830,962 B2
(45) Date of Patent: Nov. 10, 2020

(54) INGRESS PROTECTED ADAPTER ASSEMBLY WITH A LOCKABLE DUST CAP

(71) Applicant: Senko Advanced Components, INc, Marlborough, MA (US)

(72) Inventor: Paul Newbury, Ashland, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/683,034

(22) Filed: Nov. 13, 2019

(65) Prior Publication Data
US 2020/0150354 A1    May 14, 2020

Related U.S. Application Data

(60) Provisional application No. 62/760,713, filed on Nov. 13, 2018.

(51) Int. Cl.
*G02B 6/38* (2006.01)
*H01R 13/52* (2006.01)

(52) U.S. Cl.
CPC ....... *G02B 6/3849* (2013.01); *H01R 13/5213* (2013.01)

(58) Field of Classification Search
CPC .. G02B 6/3849; G02B 6/3858; G02B 6/3898; G02B 6/36; G02B 6/38; G02B 6/3887; G02B 6/44; G02B 6/3893; G02B 6/3825; G02B 6/3821; G02B 6/4471; H01R 13/5213; F16J 15/00; F16J 15/06; F16J 15/10; F16J 15/021; F16J 15/061; F16J 15/0887

USPC ........................................... 385/135–139, 78
See application file for complete search history.

(56) References Cited

U.S. PATENT DOCUMENTS

2013/0114932 A1* 5/2013 Horibe ................. G02B 6/3898
                                                    385/78
2017/0299817 A1* 10/2017 Huang .................... G02B 6/36

FOREIGN PATENT DOCUMENTS

| CN | 107925196 A | 4/2018 |
| WO | 2016/101218 A1 | 6/2016 |
| WO | 2018/023837 A1 | 2/2018 |

OTHER PUBLICATIONS

International Search Report and Written Opinion issued for PCT/US2019/061290 dated Feb. 10, 2020, 8 pages.

* cited by examiner

*Primary Examiner* — Michael P Mooney
(74) *Attorney, Agent, or Firm* — Edward S. Jarmolowicz, Esq.

(57) ABSTRACT

A lockable dust cap is inserted over a proximal end of an adapter assembly. The lockable dust cap has locking arms that secured the dust cap hub to the proximal end of the adapter assembly, and a grip portion that when rotated from an unlocked "0" or locked "1" position the dust cap is secured at the proximal end of the adapter. The dust cap is ingress protected with a seal and polymer shroud that covers the proximal end of the adapter. This helps to prevent moisture or debris ingress into the adapter assembly.

8 Claims, 7 Drawing Sheets

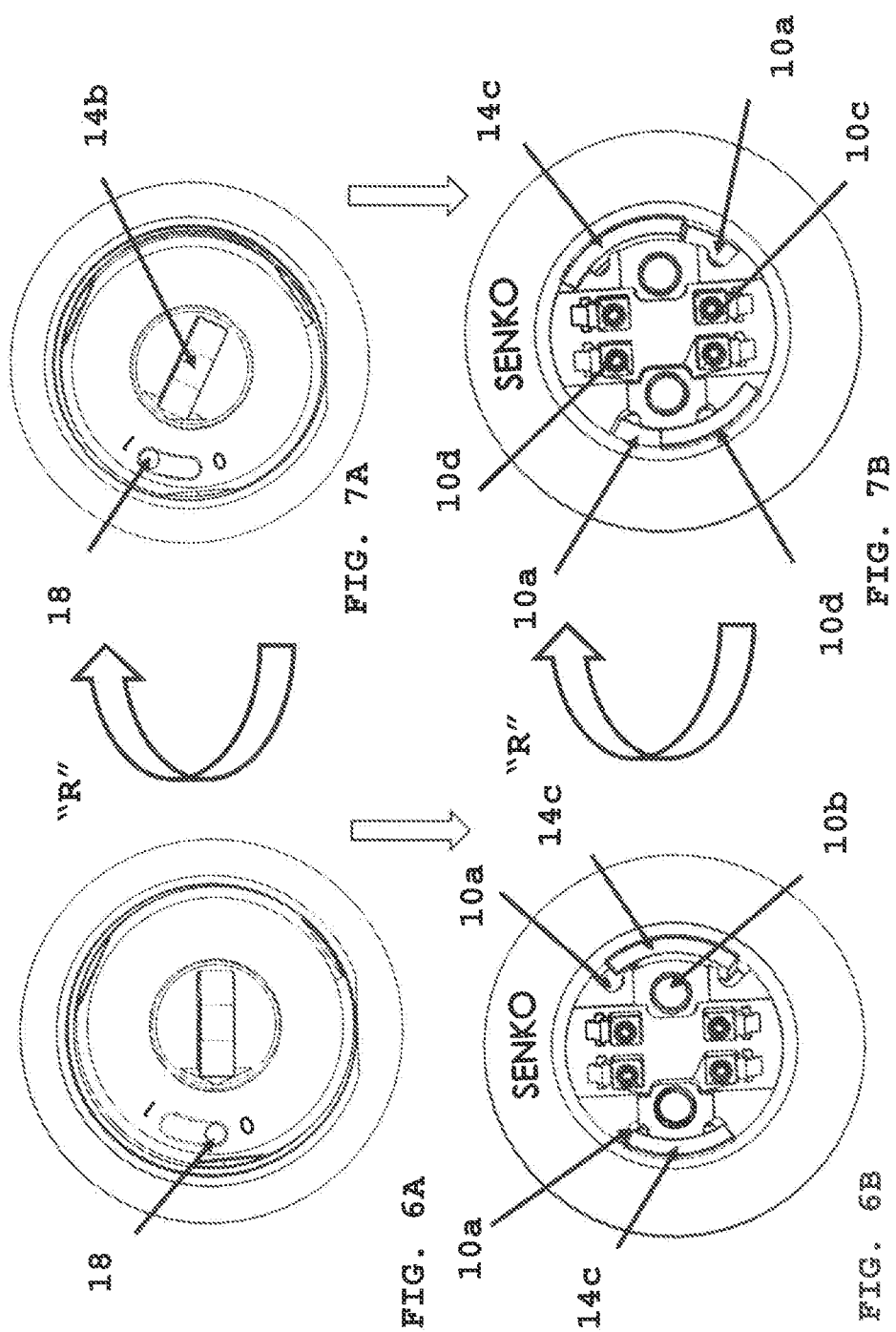

INGRESS PROTECTED ADAPTER ASSEMBLY WITH A LOCKABLE DUST CAP

RELATED APPLICATIONS

This application claims priority to U.S. Pat. Appl. No. 62/760,713 filed Nov. 13, 2018 and titled "Locking Dust Cap for Ingress Protected Connector", which is fully incorporated by reference into the present application.

FIELD OF THE INVENTION

The described technology generally relates to outdoor connector assemblies configured to provide ingress protection against debris, water and other foreign matter. The ingress protected connector has a separate fiber optic connector secured therein. The present invention is directed to a connector with an orientation feature to align the connector into an adapter for mating to an opposing fiber optic connector.

BACKGROUND

The efficiency and reliability of telecommunication networks is dependent on various factors, such as the quality of connections between cable segments, network equipment, devices, and other cable segments. Telecommunication equipment is increasingly being used in harsh environments, including factories, motor vehicles, industrial equipment, military equipment, and on cellular antennae towers. In such environments, conventional connection assemblies often become unintentionally disconnected due to vibration, impact, temperature changes, and exposure to other harsh environmental conditions. In addition, the connection between components may be negatively effected by the ingress of dust, dirt, moisture, and/or other contaminants. Fiber optic network segments are particularly vulnerable because fiber optic connections require extremely precise termination and alignment between connected components and cable segments. Accordingly, telecommunication network providers would benefit from a connection assembly capable of maintaining a secure connection and preventing the ingress of unwanted contaminants in harsh environments.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one aspect, an ingress protected connector has an o-ring or seal that is received within a groove formed as part of a lockable dust cap. The O-ring seals an adapter assembly with the lockable dust cap to prevent debris or moisture ingress. The lockable adapter dust has a gripping portion with a visual indicator. When the rotatable locking pin is in the unlock or "0" position, the dust cap is removable from the adapter assembly. The adapter assembly accepts a pair of locking arms formed as part of the adapter dust cap. The locking arms are received in slots within adapter assembly. The slots are configured to lock the locking arms for the lockable dust cap. The adapter assembly further comprises a plural of power and fiber optic connection terminals or access ports.

BRIEF DESCRIPTION OF THE DRAWINGS

FIG. 6A is a front view of lockable dust cap assembly of FIG. 5 in an unlocked position with the adapter assembly;

FIG. 6B is a rear view of FIG. 6A;

FIG. 7A is a front view of lockable dust cap adapter assembly with the lockable dust cap assembly of FIG. 5 in the locked position with the adapter assembly;

FIG. 7B is a rear view of FIG. 7A, and

DETAILED DESCRIPTION

The described technology generally relates to ingress protected connectors with an orientation feature generally at a proximal end of the connector. This ingress protected connector is used outdoors, and mated with an adapter that together with other fiber optic components forms a network that may include any type of network capable of transmitting signals, electricity, or any other type of transmission medium. For example, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the ingress protected connector with an orientation feature may be configured to connect cable segments and/or devices within a fiber optic network using various standard connector types, including, but not limited to LC, ST, SC, FC, DIN, D4, SMA, E2000, Biconic, FullAXS, OCD, and/or MPO. In some embodiments, the lockable connection assemblies may be configured to meet various standards, such as the British Standards Institution (BSI), the Open DeviceNet Vendors Association (ODVA), and/or the like. In some embodiments, the lockable connection assemblies may be used with copper-type network connections, such as RJ-45 type connectors.

According to some embodiments, the ingress protected orientation featured connector may be configured to lock itself to a connection assembly adapter (for instance, a receptacle, female connector, adapter, or "lockable adapter") (collectively, the "connection components" or "complementary mating components"), or vice versa.

The described technology provides multiple technological advantages. A non-limiting example of an advantage is too protect otherwise exposed connectors or adapters with a lockable dust cap that cannot be dislodged without a deliberated user unlocking of the cap from the adapter assembly. The dust cap shroud provides further ingress protection for the external structure of the adapter assembly. The present invention adapter assembly accepts a corresponding ingress protected connector such as the connector disclosed in US2019/0302374A1, titled "HYBRID INGRESS PROTECTED CONNECTOR AND ADAPTER ASSEMBLY", Benjamin LEE, filed on Mar. 5, 2019 and this pending patent application assigned to the assignee of the present application is fully incorporated by reference.

The above and other objects of the present invention will become more readily apparent from the following detailed description taken in connection with the accompanying drawings.

Figure 1:
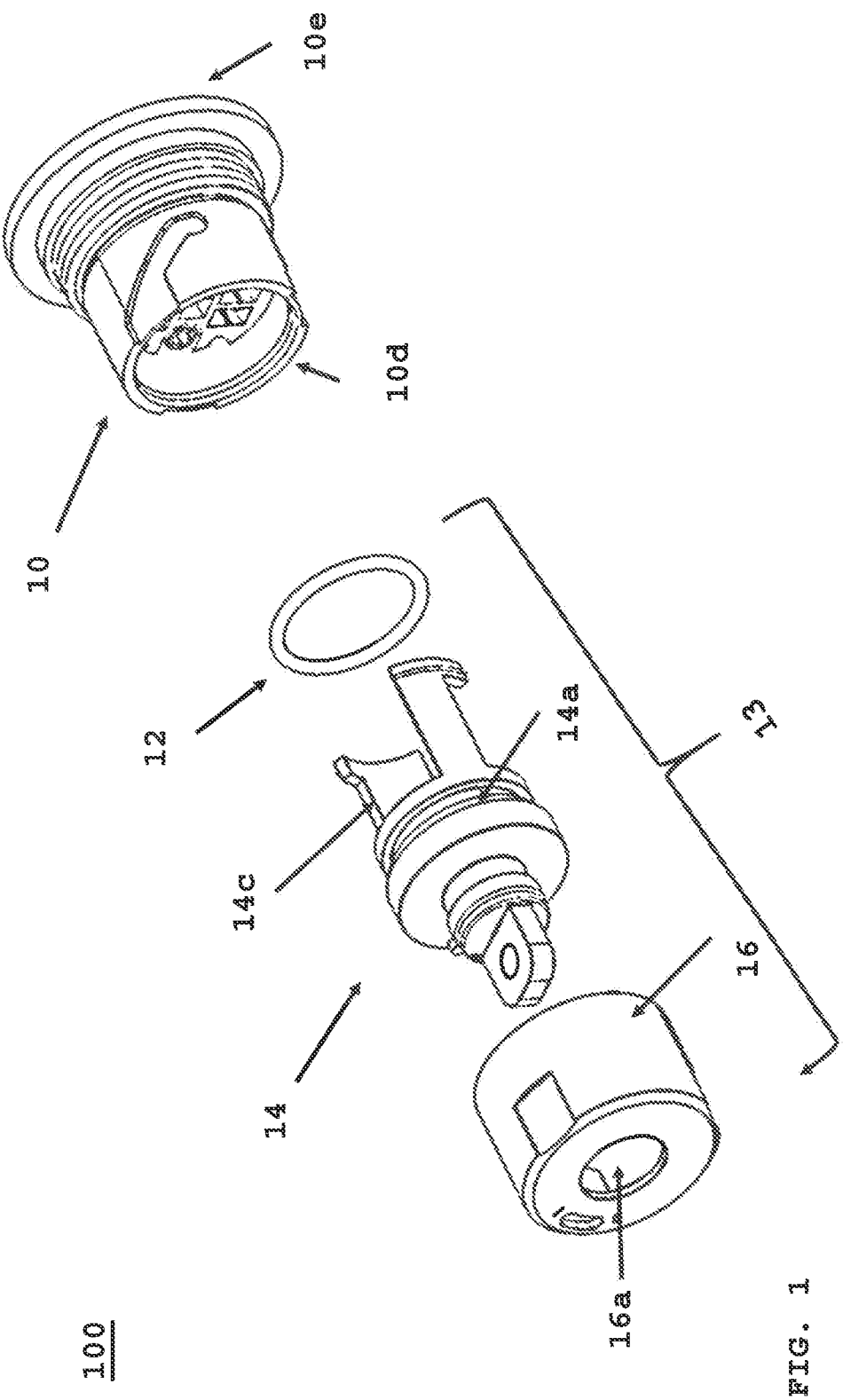
FIG. 1 is an exploded view of the lockable dust cap and adapter assembly.

FIG. 1 depicts an exploded view of the ingress protected adapter locking dust cap assembly (100). Adapter assembly (10) is similar disclosed in US 2019/0302374A1, and is configured (as described in FIG. 8 below) to accept at least one locking arm (14c) formed at a distal end (10e) of adapter dust cap hub (14). Adapter dust cap hub (14) is recessed (14a) to accept O-ring (12) to seal the dust cap assembly from moisture and debris ingress defining assembly (100) as ingress protected. Adapter dust cap shroud is secured about recess (14e) (refer to FIG. 5) at its distal end, and opening (16a) accepts grip (14b) (refer to FIG. 3). Slot (16b) (refer to FIG. 2) accepts locking indicator (18) (refer to FIG. 3).

Figure 2:
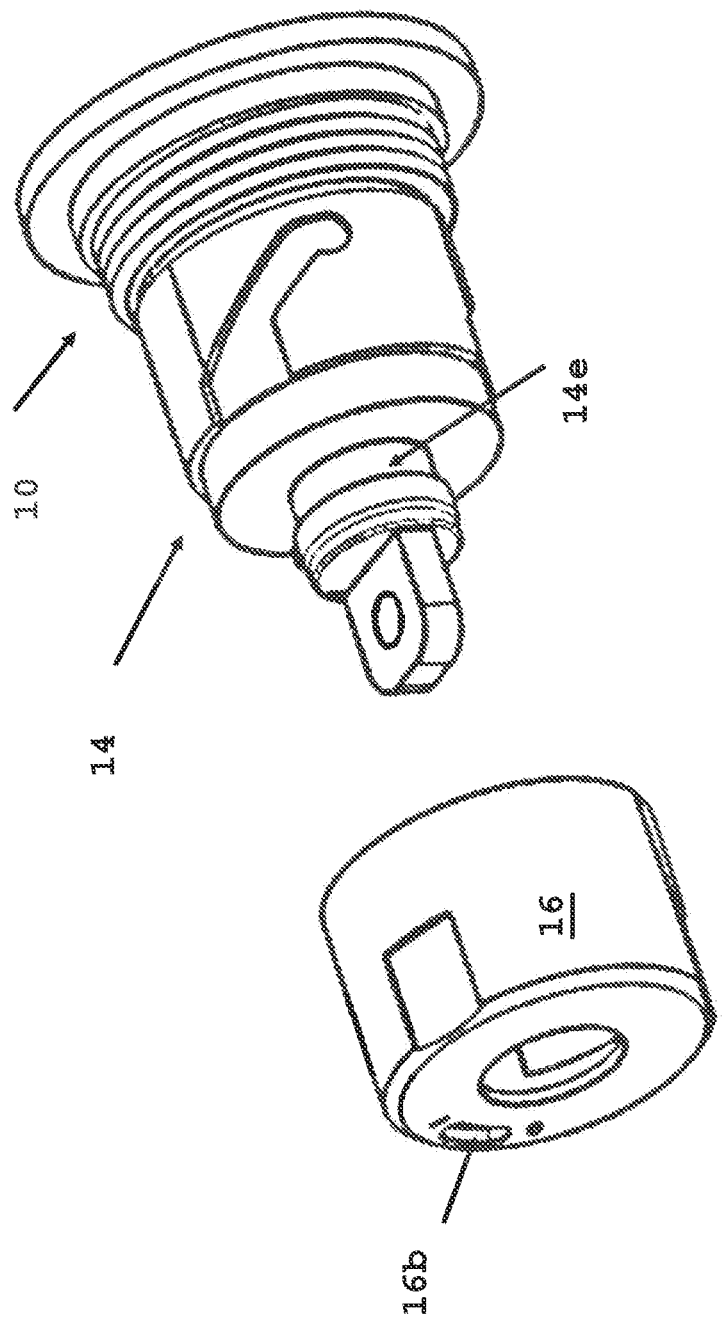
FIG. 2 is an exploded view of the adapter locking dust cap assembly.
Figure 3:
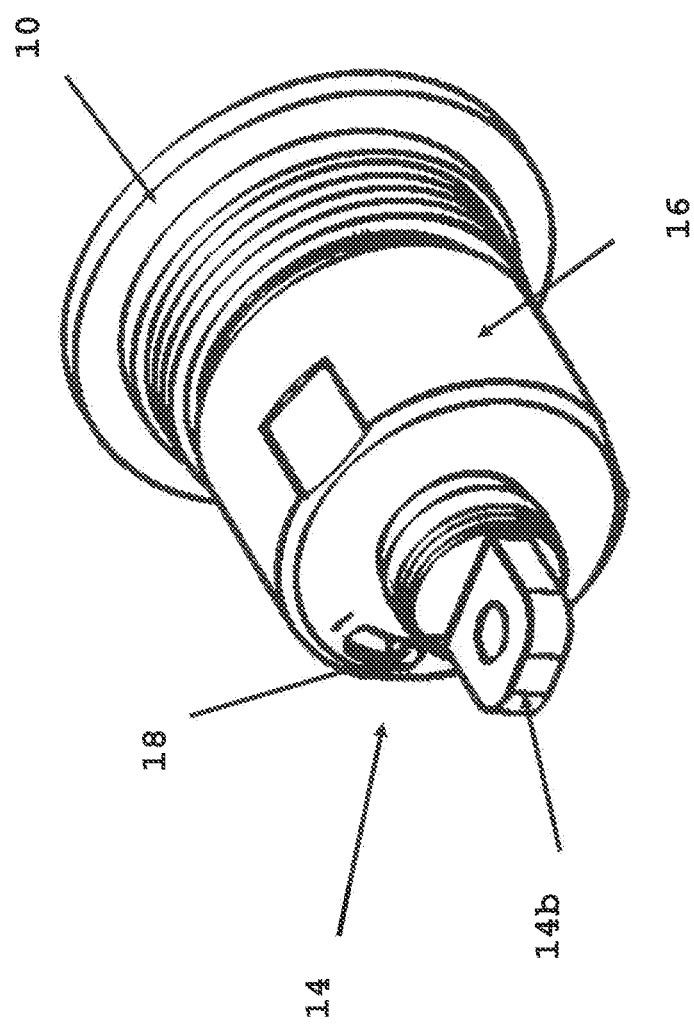
FIG. 3 is an assembled view of the adapter locking dust cap assembled to the adapter assembly.

FIG. 2 depicts an exploded view of adapter dust cap shroud (16) and adapter dust cap hub (14) secured to adapter assembly (10). Dust cap shroud (16) covers the exposed, external bayonet connector of the adapter assembly when shroud (16) is fully inserted over the proximal end of adapter assembly (10) (as shown in FIG. 3) and not covering the adapter assembly as shown in FIG. 2. Recess collar (14e) helps secure shroud (16) on the proximal end of the dust cap hug (14). The shroud body then extends over the adapter assembly proximal end. The shroud is made out of a weather and oil resistant flexible polymer to further protect the adapter assembly from moisture or debris ingress.

FIG. 3 depicts dust cap shroud (16) installed over the proximal end of adapter assembly (10). Opening (16b) provides visual access to locking pin indicator (18) that is formed as part of adapter dust cap hub (14) (further described at FIG. 4). User will rotate grip (14b) clockwise from unlock "0" to lock "1" (as shown in FIGS. 6A-7B below). In the unlocked position, the user removes adapter dust cap and shroud from the proximal end of the adapter assembly, and the user can then secure an ingress protected connector as disclosed in US US2019/0302374A1 and then reuse the dust cap assembly.

Figure 4:
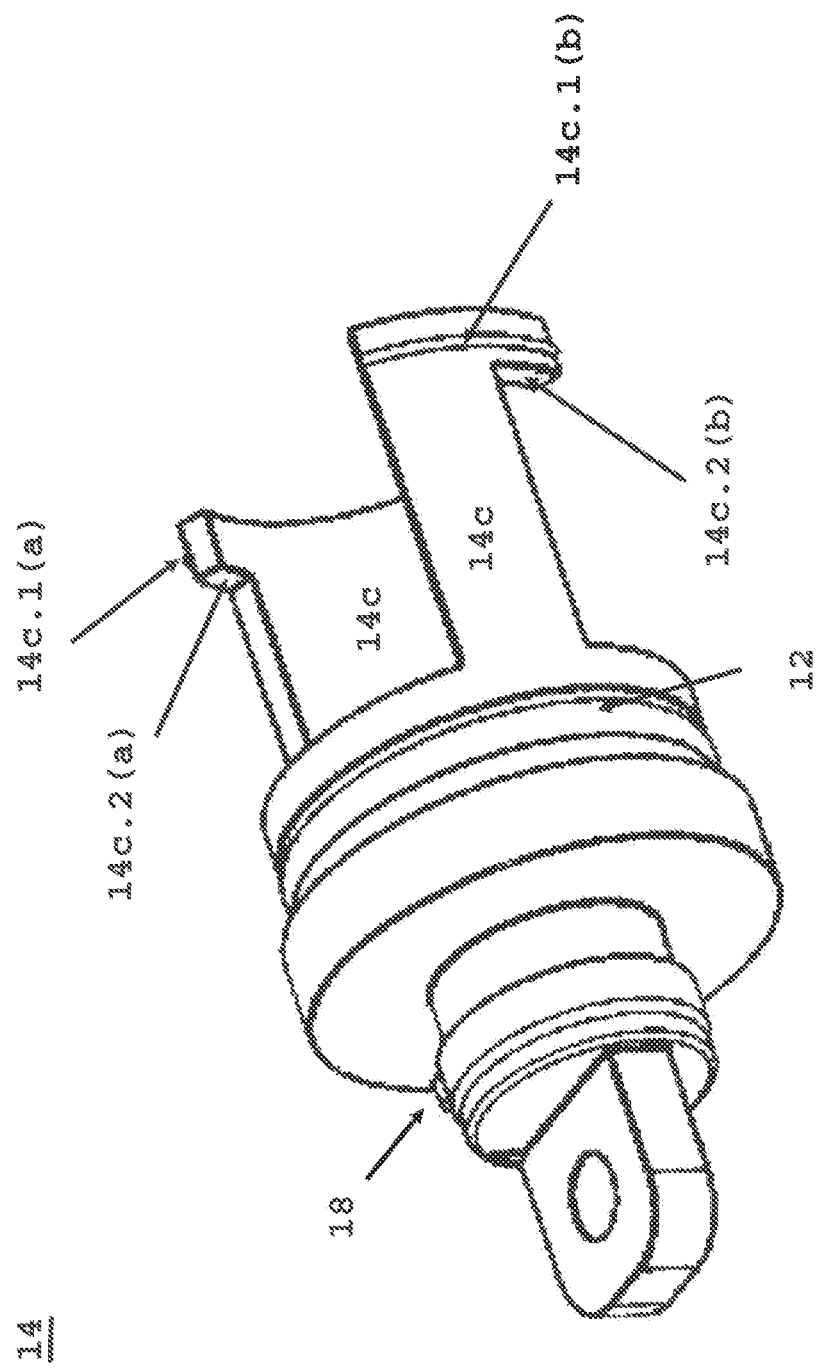
FIG. 4 is a perspective view of the locking dust cap hub.

FIG. 4 depicts a perspective view of the adapter dust cap hub (14). A pair of opposing locking arms (14c) project from a distal end of the cap hub. O-ring (12) provides the ingress protection for the dust cap hub when secured to the adapter assembly. Each locking arm (14c) has raised edge (14c.1(a), 14c.2(b)) that snaps into a groove within the adapter assembly slot, and locking surface (14c.2(a), 14c.2(b)) that secures the dust cap hub to the adapter assembly when locking pin (18) is rotated into the locked position as shown by visual indicator "1" and arrow (18a) (refer to FIG. 5) indicates which position, lock or unlock, the dust cap hub is positioned. The raised edge allows the user to rotate the dust cap hub using the grip without dislodging the dust cap hub from the adapter assembly. And the raised edge provides an audible indicator the dust cap assembly is inserted into a proximal end of the adapter assembly and the dust cap assembly can be locked.

Figure 5:
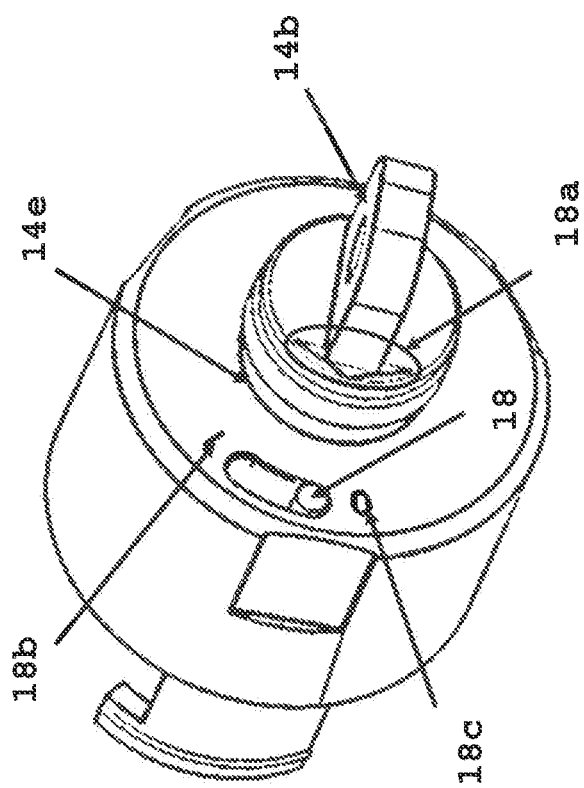
FIG. 5 is a perspective view of the locking dust cap hub assembled with a locking dust cap shroud.
Figure 8:
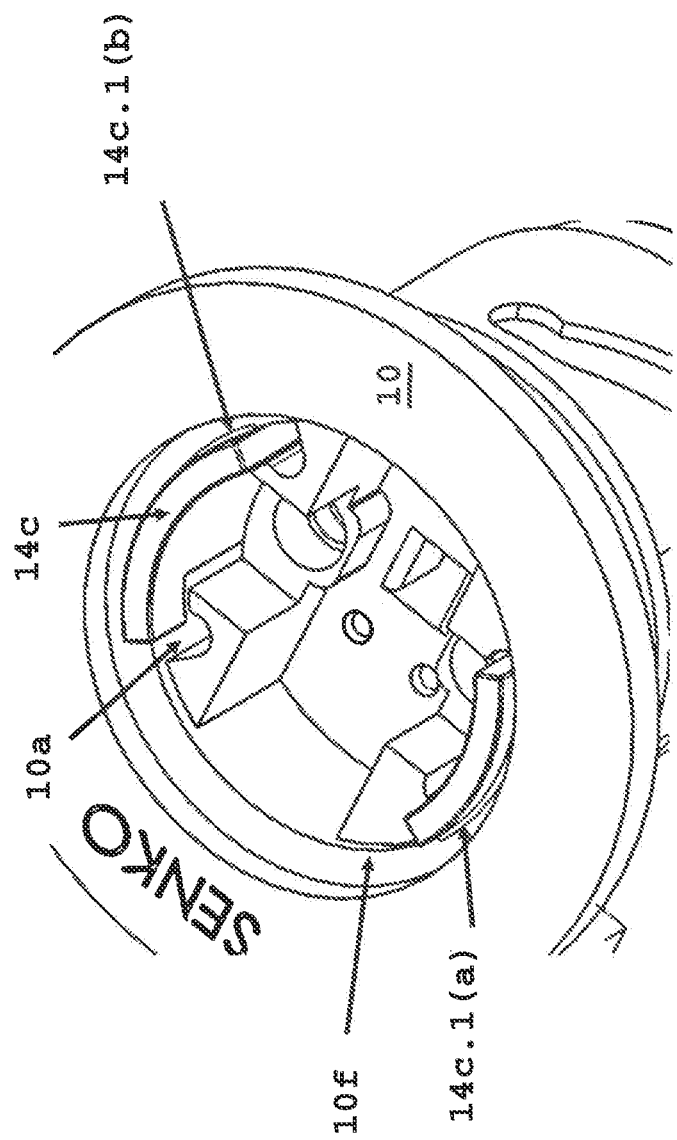
FIG. 8 is a zoomed view of the adapter assembly with the lockable dust cap installed.

FIG. 5 depicts adapter dust cap assembly (13) (FIG. 1) showing grip (14b) as indicated by arrow (18a) in unlocked (18c) position. Shroud (16) is friction fitted over recess (14e) which helps retain the shroud in place to protect the proximal end of the adapter assembly from moisture or debris ingress. FIG. 6A and FIG. 7A depict unlocked "0" position of adapter dust cap assembly (13) as indicated by locking pin (18), (FIG. 6A), and in locked "1" position as indicated by FIG. 7A. FIG. 6A is a front view of assembly (13) and FIG. 6B is the rear view of FIG. 6B. Slots (10a) accept locking arm (14c). FIG. 7B depicts locked position, and locking arms rotate in direction of arrow "R" exposing slots (10a) as shown. In this locked position, locking surfaces (14c.2(a), 14c.2(b)) are received within cut-out (not shown) positioned within slot (10a). FIG. 8 depicts zoomed view of locking arms (14c) within slot (10a) and raised edge (14c.1(a), 14c.1(b)) accepted within groove (10f) allowing rotation of dust cap and shroud without dislodging the assembly (13) from the proximal end of adapter assembly (10). Each adapter assembly can accept power using connector pin (10d) and transmit light signal via fiber connectors (10c).

Although an adapter assembly has been used as an illustrative embodiment, this detailed description is not so limited, as any type of electrical and/or communication adapter assembly that may be used according to some embodiments. The connectors, adapters, and lockable components thereof may be used in combination with other connection elements and/or materials, such as crimpers, bands, straps, ferrules, locking materials, fluids, gels, or the like.

It will be appreciated that various of the above-disclosed and other features and functions, or alternatives thereof, may be desirably combined into many other different systems or applications. Like numbering between drawings represent the same component or element. Locking arm (14c) may be more than one locking arm (14c), and each locking arm may have the same features such as a raised edge (14c.1) and distinguished between locking arms by (14c.1(a) and 14c.1(b)).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A lockable ingress protected dust cap comprising:
an adapter assembly configured to accept and lock an adapter dust cap hub to be inserted into the adapter assembly,
the adapter dust cap hub has a sealing surface, at least one locking arm extending in the insertion direction, a grip and a locking pin indicator; wherein the adapter assembly has a slot corresponding to each locking arm of the adapter dust cap hub to accept the locking arm, wherein the locking arm and the slot secure the adapter dust cap hub within a proximal end of the adapter assembly.

2. The lockable ingress protected dust cap according to claim 1, wherein the adapter dust cap hub further comprises a recess, and the recess is configured to accept a seal ring for providing a seal against water, dust, or debris from damaging fiber optic or electrical components within the adapter assembly.

3. The lockable ingress protected dust according to claim 1, wherein the locking arm is configured to be accepted into the slot formed as part of the adapter assembly, the locking arm is rotated using the grip to lock and unlock the adapter dust cap from the adapter assembly.

4. The lockable ingress protected dust cap according to claim 2, wherein the adapter assembly further comprises a locking arm groove, and the adapter dust cap hub locking arm further comprises a locking surface that secures to the groove when in the locked position.

5. The lockable ingress protected dust cap according to claim 4, wherein the locking arm further comprises a raised edge, that creates an audible indicator when the adapter dust cap hub is fully inserted into the adapter assembly.

6. The lockable ingress protected dust cap according to claim 1, further comprising an adapter dust cap shroud for providing ingress protection at the proximal end of the adapter assembly.

7. The lockable ingress protected dust cap according to claim 1, wherein in a first position the locking pin indicator denotes the adapter dust cap hub is unlocked from the adapter assembly, and in a second position the locking pin indicator denotes the adapter dust cap hub is locked to the adapter assembly.

8. A method of using a lockable ingress protected dust cap comprising:
providing the lockable ingress protected dust cap according to claim 6;
sliding locking pin from a "0" position to a "1" position to secure the adapter assembly from moisture and debris ingress, thereby providing ingress protection;
sliding locking pin from a "1" position to a "0" position to unlock the adapter dust cap hub from the adapter assembly thereby reducing the ingress protection.

* * * * *